United States Patent [19]

Junod et al.

[11] 4,315,324

[45] Feb. 9, 1982

[54] DIRECTLY MODULATED SONOBUOY TRANSMITTER USING SURFACE ACOUSTIC WAVE SENSOR

[75] Inventors: Michael T. Junod; Albert M. Bates, both of Southampton, Pa.

[73] Assignee: The United States of America as represented by the Secretary of the Navy, Washington, D.C.

[21] Appl. No.: 186,354

[22] Filed: Sep. 11, 1980

[51] Int. Cl.³ .............................................. H04B 1/59
[52] U.S. Cl. ...................................... 367/3; 367/149; 367/164
[58] Field of Search ................... 367/149, 163, 174, 3, 367/4, 5; 310/313 B, 337

[56] References Cited

U.S. PATENT DOCUMENTS 3,875,548  4/1975  Acks ........................................ 367/3
3,878,477  4/1975  Dias et al. ....................... 310/313 B

OTHER PUBLICATIONS

A Surface Acoustic Wave Sonobuoy by P. Das et al., Electrical and Systems Engineering Dept., Rensselaer Polytechnic Institute, Troy, NY, ten pages written material, nine pages of drawing figures.

*Primary Examiner*—Richard A. Farley
*Attorney, Agent, or Firm*—R. S. Sciascia; Henry Hansen

[57] ABSTRACT

Serving as a hydrophone in the lower unit of the sonobuoy, two surface acoustic wave resonators for determining the resonant frequency of two independent oscillators are also used to sense pressure and thus sound. The outputs of the two resonators are mixed and then passed through a low pass filter to provide a low frequency hydrophone output signal and to remove temperature induced signal distortion. A line driver and low cost twin lead transmission line provides the signal to the upper floatation electronic unit of the sonobuoy for conversion to the desired RF carrier frequency. In a single-channel sonobuoy, this signal is multiplied and amplified for transmission to a distant receiver. In a multi-channel sonobuoy, this signal acts as a reference frequency for the frequency synthesizer section of the sonobuoy transmitter.

3 Claims, 2 Drawing Figures

DIRECTLY MODULATED SONOBUOY TRANSMITTER USING SURFACE ACOUSTIC WAVE SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a system for receiving sound pressure levels in a water environment and for modulating a carrier with said levels for transmission to a remote receiver, and more particularly to a sonobuoy which utilizes surface acoustic wave (SAW) resonators as a sound pressure level detector and as an information modulated reference frequency source for a selectable channel transmitter.

The reception of a target-emitted sound wave in a water environment is normally accomplished by means of a pressure sensitive device called a hydrophone comprising a quartz crystal. The device produces a voltage output proportional to the sound pressure level impinging on it and feeds the voltage to the transmitter unit where it is utilized to frequency modulate a carrier frequency. For example, in one of the prior art sonobuoys the gain compensated hydrophone output voltage causes a varactor diode to deviate the center frequency of a crystal oscillator. This technique is usable but causes degradation of the stability of the transmitter's carrier frequency. In such a system the target emissions are transformed from pressure to voltage and then from voltage to frequency before being placed in the proper format for transmission to a remote receiving station. Additionally in the band of interest, amplitude flatness extending toward DC can only be accomplished through the use of large components.

Another sonobuoy utilizes direct frequency modulation within a hydrophone by the impinging sound waves on it. In this case, the hydrophone comprises a surface acoustic wave (SAW) resonator operating at an RF frequency. These high operating frequencies make it impracticable to use the resonator at the normal hydrophone deployment depths of between sixty to a thousand feet. The signals from the hydrophone normally low in amplitude are excessively attenuated by the cable impedance which can only be minimized by the utilization of low loss coaxial cable. Such cables are heavy, expensive, occupy much space and are not practical for sonobuoy use. Addtionally the resonator used in this manner is inappropriate for multi-channel transmitter operation.

SUMMARY OF THE INVENTION

Accordingly, the general purpose and object of this invention is to provide an improved sonobuoy whose hydrophone utilizes a SAW resonator to directly frequency-modulate a signal so that an information-modulated reference signal is provided to an associated transmitter. Another object is to provide a simpler, smaller and more compact sonobuoy transmitter having fewer electronic components. Still another object is to provide a system with a more stable transmitter carrier frequency having increased detection sensitivity, and an acoustic response extending to DC without the use of large components. Yet another object is to provide a system which can operate properly with audio band hydrophone cable in conjunction with either a single or multichannel transmitter. It is a further purpose of the invention to provide a receiving and transmitting system which can be utilized to receive sound pressure levels emitted in a water environment by a sound source such as motorized vehicles and to transform the pressure levels into deviations of a transmitter carrier frequency and to transmit that modulated carrier to a remote receiving station.

Briefly, these and other objects of the present invention are accomplished by utilizing a hydrophone comprising two SAW resonators etched on a single substrate, each connected as frequency determining elements of independent oscillators. The outputs of the oscillators are deviated about their center frequency by the sound pressure levels impinging on the SAW resonators and are then mixed to produce a sum and difference frequency. The difference frequency is sufficiently low enough to pass through a twin-lead cable with minimum signal attenuation over the length of cable connecting the hydrophone to an associated transmitter. The transmitter includes a phase-locked loop frequency synthesizer for generating selectable VHF carriers, which utilize the difference frequency from the hydrophone as a reference signal.

These and other objects of the instant invention can be more readily understood, and the uniqueness of the detection system and more particularly the SAW resonator as a detector and direct frequency modulator as well as its manner of construction and use will be more readily appreciated from the following detailed description, taken in conjunction with the accompanying drawings forming a part hereof, in which:

DESCRIPTION OF THE PREFERRED EMBODIMENTS

Figure 1:
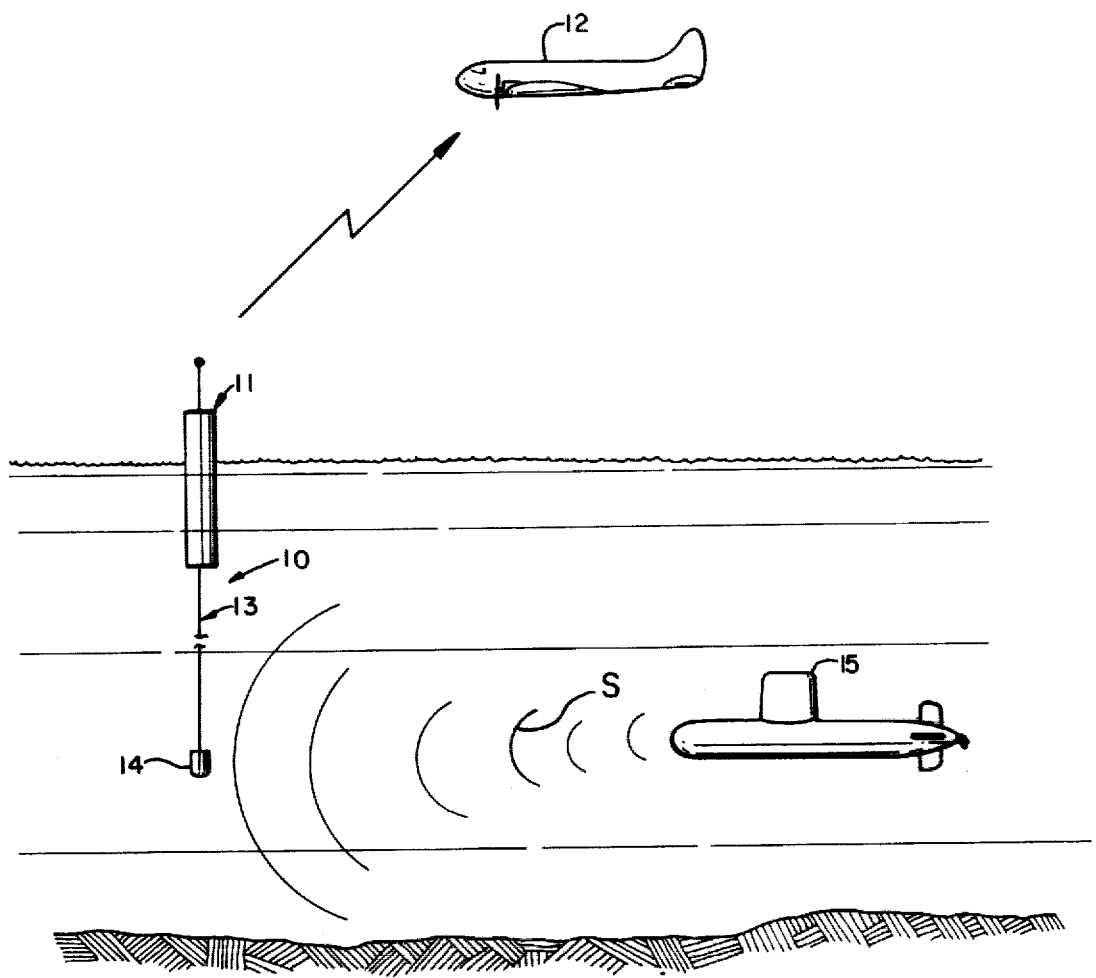
FIG. 1 is a representation of a sonobuoy according to the invention deployed in a typical scenerio.

Referring now to the drawings, wherein like reference characters designate like or corresponding parts throughout the several views, there is illustrated in FIG. 1 a sonobuoy 10 comprising a buoyant transmitter 11 typically deployed on the surface of the water for transmitting acoustic information to an aircraft 12. Suspended from the transmitter 11 by a cable 13 is a deployed hydrophone or pressure sensor 14 receiving sound pressure waves S from a submarine 15.

Figure 2:
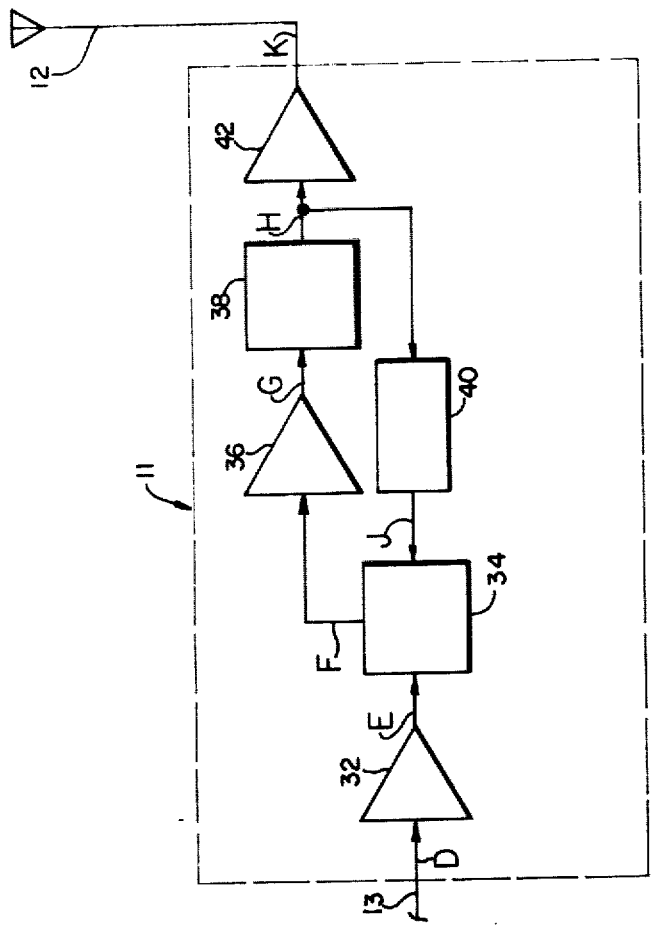
FIG. 2 is a block diagram of the sonobuoy of FIG. 1 including a transmitter for selectable channel operation.
Figure 2:
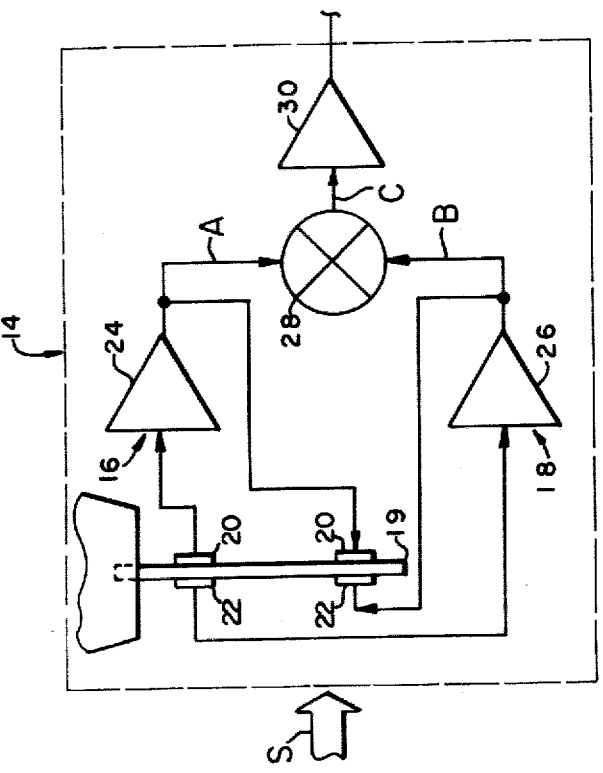

Referring now to FIG. 2, in conjunction with FIG. 1, hydrophone 14 includes a pair of oscillator circuits 16 and 18 respectively consisting of a SAW resonator 20, 22 and an amplifier 24, 26. SAW resonators 20 and 22 are etched or deposited on a substrate 19 in the manner disclosed in U.S. Pat. No. 3,848,144. The sound pressure waves S impact on hydrophone 14 and change the physical characteristics of resonators 20 and 22 resulting in an output frequency change of oscillators 16 and 18, respectively. Oscillators 16 and 18 generate signals A and B respectively, each consisting of a discrete frequency deviated about the oscillator resonant frequency as a function of sound pressure. A mixer 28 is connected to receive signals A and B for producing a signal C consisting of the sum $A+B$ and the difference $A-B$ of the two signals. A line driver 30 is connected to receive signal C at its input for producing a driver output signal D having greater current-driving capacity than the input signal. A cable 13 is connected to receive the driver output signal D and is selected having a characteristic inpedance sufficient to provide low pass filtering so that the sum signal A+B is attenuated while the difference signal A−B passes unattenuated. A line receiver 32 is connected to receive that part of signal D consisting only of difference signal A−B for producing a receiver output signal E having greater amplitude than signal D. A phase comparator 34 is connected to receive signal E for use as a reference signal and a second input signal J explained herein below. Comparator 34 detects the phase errors of signal J relative to signal E and provides when necessary an error command signal F. Loop filter 36 is connected to receive and store signal F and to provide a signal G consisting of an integrated signal F. Voltage controlled oscillator (VCO) 38 is connected to receive signal G and to provide signal H consisting of a discrete frequency being an integral multiple of the signal E, frequency modulated by the sound waves S. Power amplifier 42 is connected to receive signal H and to provide signal K consisting of signal H having greater power and amplitude. Antenna 12 is connected to receive signal K to provide coupling of signal K into the surrounding atmosphere. Counter 40 is also connected to receive signal H, divide it down to signal J consisting of pulses with a repetition rate equal to the reference signal E and provide it as the second input to comparator 27. Phase errors between signal J and reference signal E produce error command signal F as stated hereinabove.

Operation of the directly modulated sonobuoy transmitter which utilizes SAW resonators as a pressure sensor is now summarized with reference to FIGS. 1-2. A sonobuoy 10 is deployed in an ocean environment wherein a hydrophone 14 receives sound pressure levels emitted for example by a target vessel 15. The sound pressure waves S impinge on hydrophone 14 and cause the SAW resonators 20 and 22 mounted on a substrate 19 to change their physical shape. The physical change of the resonators 20, 22 cause oscillators 16 and 18 respectively to deviate from their resonant frequency as a function of the impinging sound pressure level. The output signals A and B from oscillators 16 and 18 respectively have the same stability as a conventional crystal oscillator.

In the disclosed embodiment the SAW resonators 20 and 22 are used as the frequency determining element of oscillators 16 and 18 respectively. It is characteristic of SAW resonators to be sensitive to temperature as well as pressure. Since the resonators are mounted in close proximity each oscillator's resonant frequency is changed equal amounts as a function of temperature. The temperature sensitivity is thereafter cancelled by mixing signal A and B in mixer 28 and utilizing only the difference signal A−B therefrom.

Although the temperature effect on the resonators is frequency independent and is cancelled, through the geometries, the pressure effect causes a percentage modulation of the center frequency. When the frequency difference of two pressure modulated signals is taken the resultant signal has a modulation of the same percentage of each of the original sources. Thus, if A (t) is the output signal of oscillator 16 and B (t) the output signal of oscillator 18 at time t, our mathematical formulation of the problem is of the following form:

| | center frequency | pressure angle modulation | temperature offset |
|---|---|---|---|
| $A(t) = $ | $COS(W_{c1}(t)$ + | $\phi_1(t)$ + | $F(T))$ |
| $B(t) = $ | $COS(W_{c2}(t)$ + | $\phi_2(t)$ + | $F(T))$ |

$$A(t) - B(t) = COS(W_{c1}(t) - W_{c2}(t) + \phi_1(t) - \phi_2(t)) + COS(W_{c1}(t) + W_{c2}(t) + \phi_1(t) + \phi_2(t))$$

LOW PASS FILTERING:

$$A(t) - B(t) = COS(W_{c1}(t) - W_{c2}(t) + \phi_1(t) - \phi_2(t))$$

$\phi_1(t) = P \sin W_m t \qquad W_m = $ Modulation $$P_1 = \frac{K \cdot W_{c1}}{wm} \qquad P_2 = \frac{K \cdot W_{c2}}{wm}$$

$$A(t) - B(t) = COS(W_{c1}(t) - W_{c2}(t) + \frac{K}{wm}(W_{c1} - W_{c2}) \sin W_m t$$

$W_0 = W_{c1} - W_{c2}$
$X_0(t) = COS(W_0(t) + \phi_0(t))$
$\phi_0(t) = P_0 \sin W_m t \qquad P_0 = \frac{K}{wm}(W_{c1} - W_{c2})$ Where
A = output signal of Oscillator 16
B = output signal of Oscillator 18
t = time
$W_{c1}$ = center (carrier) radian frequency of Oscillator 16
$W_{c2}$ = center (carrier) radian frequency of Oscillator 18
$W_m$ = radian frequency of modulation
$\phi_1$ = pressure related angle modulation of Oscillator 16
$\phi_2$ = pressure related angle modulation of Oscillator 18
$\phi_0$ = pressure related angle modulation of the composite signal
F = temperature related angle modulation
T = temperature
$P_1$ = modulation index of Oscillator 16
$P_2$ = modulation index of Oscillator 18
$P_0$ = modulation index of composite signal
K = constant of proportionality The invention involves the operation of a hydrophone which utilizes SAW resonators 20 and 22 as pressure sensitive devices feeding the modulated resonator's output over a cable 13 to a floating transmitter 11 for transmission to a remote receiver. The operating frequencies of the two oscillators 16 and 18 are preselected such that the output of mixer 28 produces a difference signal A−B which is a reference submultiple of transmitter 11 channel spacing and sum signal A+B which is many orders higher.

For example, when no target emitted pressure waves S impinge on hydrophone 14 oscillator 16 provides signal A at 60.000 mhz, oscillator 18 provides signal B at 60.124 mhz and mixer 28 provides signal D consisting of the sum signal A+B at 120.125 mhz and the difference signal A−B at 0.125 mhz. Should it become necessary to operate oscillators 16 and 18 at a wider frequency separation a low power counter stage between the mixer 28 and the line driver 30 may be included to divide down the different frequencies into the near audio range. Cable 13 passes only the A−B portion of signal D. Line receiver 32 receives signal D from cable 13 and outputs signal E as the reference for a phase locked loop frequency synthesizer (34, 36, 38, 40) which provides the selectable channel feature of transmitter 11. Under the above stated conditions transmitter 11 provides an unmodulated carrier signal.

When target emitted pressure waves S impinge on hydrophone 14 signal A is deviated from 60.000 to 60.130 mhz, signal B is deviated from 60.125 to 59.995 mhz. Signal D sum signal A+B remains 120.125 mhz but difference signal A−B is deviated from 0.125 to 0.135 mhz. The resulting deviation of the difference frequency causes transmitter 11 to now provide a frequency modulated carrier signal. The frequency modulation resulting from sound pressure level intrinsically introduced on signal E causes voltage controlled oscillator 38 to be modulated without degrading the stability of the transmitted frequency.

Therefore, some of the many advantages of the present invention should now be apparent. In summary the use of SAW resonators as sound pressure detectors which produce an FM modulated signal as its output makes it unnecessary to provide the gain compensation and modulation stages found in the prior art sonobuoy. SAW use results in a simpler design which requires less parts occupying less volume. By producing the modulation intrinsically with the SAW resonators, the stability of the carrier frequency for a given modulation is the same as a conventional crystal oscillator. The SAW resonator having 25 mil thickness has a pressure sensitivity of 9.7 times $10^{-5}$ ppm/pa; corresponding to a sensitivity of −180 db reference to 1 volt per micro pascal or a 14 db improvement over conventional hydrophones. Since the information from a target vessel undergoes fewer transformations in this invention less system noise is available to reduce system sensitivity. Furthermore maintaining amplitude flatness toward DC and phase linearity over the information bandwidth without large components is accomplished by the use of a SAW resonator which transfers the information as frequency modulation of an oscillator.

Transmitter 11 shown in FIG. 2 includes a phase-locked loop frequency synthesizer for providing selectable channel transmitter.

Obviously many modifications and variations of the present invention are possible in the light of the above teachings. It is therefore to be understood that, within the scope of the appended claims, the invention may be practiced otherwise than as specifically described.

We claim:

1. A sonobuoy for detecting sound pressure indicative of acoustic information and for transmitting a modulated carrier signal at a selected one of a plurality of equally spaced carrier frequencies containing said information to a remote receiver, comprising:

hydrophone means responsive to the sound pressure including first and second SAW oscillator means for producing a first and a second resonant frequency signal which respectively increases and decreases with pressure, and having the frequency difference at no sound pressure between the first and second signals of a predetermined submultiple of the spaced carrier frequencies, and mixer means connected to receive said first and second signals for producing a sum and difference frequency signal thereof indicative of the sound pressure;

cable means having low pass filter characteristics connected to receive the sum and difference frequency signal for passing only the difference signal; and buoyant transmitter means connected to receive and multiply the difference signal to produce the carrier signal at the selected frequency, and for transmitting the carrier signal to the remote receiver.

2. A sonobuoy as recited in claim 1 wherein said transmitter further comprises:

a line receiver having high input impedance and amplification connected to receive the difference frequency and for providing a reference signal consisting of the difference frequency amplified by said line receiver;

a phase-locked loop frequency synthesizer connected to receive the reference signal for providing selectable predetermined integral multiples of the frequency of said reference signal having an interval between each selected signal equal to the frequency difference between said first and second signal at no sound pressure;

a power amplifier connected to receive the integral multiples for providing an amplified carrier signal; and an antenna connected to receive said carrier signal for coupling it into the air.

3. A sonobuoy as recited in claim 2 wherein said phase-locked loop frequency synthesizer further comprises:

comparator means connected to receive the reference signal and a feedback signal comprising a selectable one of predetermined integral submultiples of the carrier signal frequency, for comparing the reference and feedback signals and providing an error signal indicative of phase similarity of the reference and feedback signals;

a voltage controlled oscillator connected to receive the error signal for providing the carrier signal; and a selectable divider means connected to receive and divide the carrier signal for providing the feedback signal.

\* \* \* \* \*